Figure 1:
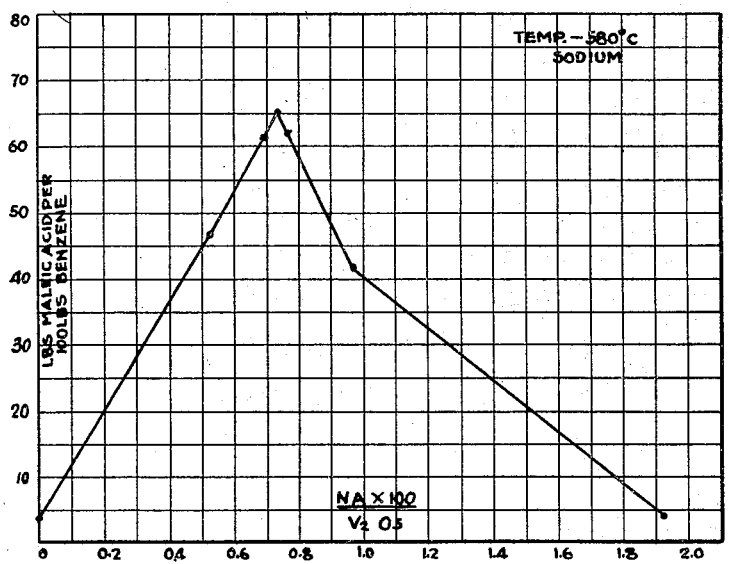
Figure 2:
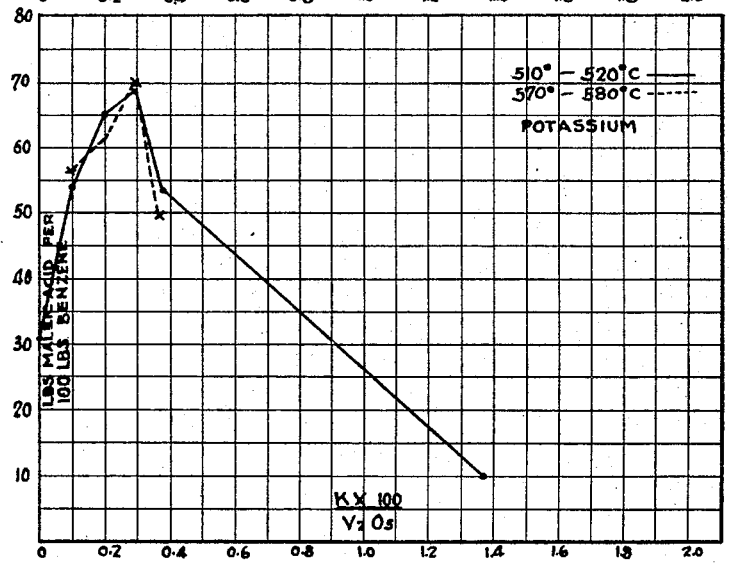
Figure 3:
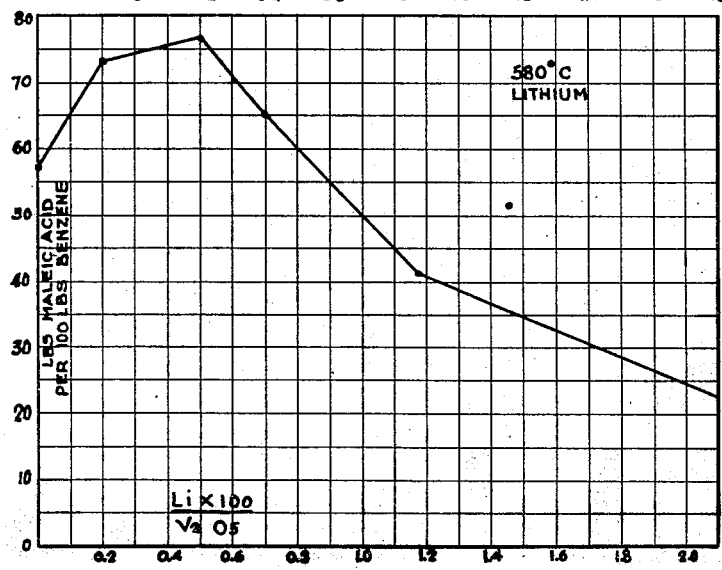

INVENTOR
John M. Weiss
BY
Dean, Fairbank & Hirsch
ATTORNEYS

Patented July 2, 1940

2,206,377

UNITED STATES PATENT OFFICE 2,206,377

CATALYTIC OXIDATION OF BENZENE

John M. Weiss, New York, N. Y., assignor to The Calorider Corporation, Greenwich, Conn., a corporation of Connecticut Application August 6, 1937, Serial No. 157,678

6 Claims. (Cl. 260—533)

This invention is in the field of the production of maleic acid and its anhydride from benzene by partially oxidizing the benzene with gases containing free oxygen in the vapor phase in the presence of a solid contact mass and comprises improved contact masses therefor and the processes in which these improved contact masses are used.

This reaction occurs only at high temperatures, usually above 300° C., and is highly exothermic. The desired reaction will not be the only reaction occurring and a certain portion of the benzene treated will be completely oxidized to oxides of carbon and water. For commercial production, it is desirable that such complete oxidation should be repressed to whatever extent it is possible. In practice, it has been found that as the temperature of the contact mass in catalytic reactions of this kind is increased, the ratio of undesirable complete oxidation to the desired partial oxidation is increased, and at a certain point with a given contact mass only complete combustion products are obtained with no production of the desired product. In general, as far as I am aware, no commercial operation in this field has been successful when any major portion of the contact mass has been allowed to reach a red heat. The problem of temperature control is very much simpler, the speed of reaction is greatly increased, and the production rate of the equipment employed is increased at such high temperature. Therefore it would be highly desirable to operate at such temperatures were it not for the disadvantage of the increased ratio of complete to partial oxidation which heretofore has always been prohibitively high from a commercial standpoint.

The first disclosure of the production of maleic acid by catalytic oxidation was in United States Patent No. 1,318,633 to Weiss and Downs in which benzene and air were passed over a vanadium oxide contact mass at temperatures of from 300° C. to 550° C. Above 550° C., according to this patent, "the yield of maleic acid decreased rapidly", the preferred operating temperature range being given as 400° C. to 450° C. As one of the co-inventors of the process disclosed in United States Patent 1,318,633 I state that, operating with the contact masses disclosed in that patent, yields of over 35 parts by weight of maleic acid per 100 parts benzene could not be obtained in a single passage of reaction gases over the mass.

Later, United States Patent 1,636,857 to Craver describes methods which claimed improvements in yield by using a mass which included vanadium oxide with a gross (30% or more) admixture of molybdenum oxide, uranium oxide or both. These masses were operated at preferred temperatures of 450° C. to 550° C. and the specific illustrations in the patent show operating temperatures in the range of 475° to 505° C. The materials added by Craver are per se catalysts for the reaction and certain combinations will produce substantial yields of maleic acid without the use of vanadium oxide. As far as I am aware, the masses of United States Patent 1,636,857 are representative of those used in present commercial operations for the oxidation of benzene to maleic acid or maleic anhydride.

United States Patent to Punnett 1,895,522 claims improvement on the process of Craver by using a special carrier (composed of "Alundum") on which the mixture of vanadium oxide and molybdenum oxide is coated and having "a small amount of activator or promoter—(such as aluminum, magnesium or their oxides, preferably in a finely divided form)". Specifically, he shows 10% of aluminum metal based on the vanadium oxides and states that "2 to 20% preferably 5 to 10% by weight of the catalytic oxide mixture" may be used. No importance is ascribed in the patent to the especial proportions of activator used or to any exact control of these proportions. The effect of Punnett's activators, as stated, is to reduce the temperature at which the reaction can be carried on and he prescribes a range of 375° to 550° C. with 475° to 525° C. preferred.

I am also aware that others have proposed various stabilizers and promoters for vanadium oxide and have suggested the use of these stabilized and promoted contact masses to produce maleic acid. In most cases, however, the amount of the so-called stabilizer or promoter has been a very large proportion of the vanadium oxide used and has varied from 25% to over 300% of the weight of the vanadium oxide employed, and in no case has the necessity of close control of the proportion of added material been disclosed.

In the preparation of contact masses, it is usual practice to form the mass by coating the catalytic agent on the surface of a carrier. In this specification, I will refer to the coating on the carrier as the productive catalytic agent and intend this term to include the coating and modifier as it exists in the actual production of maleic acid or anhydride from benzene after the operating conditions have been stabilized and the coating has reached substantial equilibrium with the carrier on which it has been coated and with the surrounding reaction conditions. Where no carrier or inert diluent is employed, the entire contact mass may be considered as the productive catalytic agent.

One object of the invention is to obtain higher yields of maleic acid or maleic anhydride from benzene by the use of a contact mass containing vanadium oxide as the main productive catalytic agent than can be obtained when vanadium oxide is the sole productive catalytic agent, and when the process is operated at the temperature commonly employed in the past.

A further object is to produce still better yields, as compared with vanadium alone, when operating at catalyst temperatures considerably above the temperatures used in the past in this field.

A further object is to provide modified vanadium contact masses which will give yields of maleic acid or maleic anhydride at least equal to those obtained by prior modified vanadium masses at the usual catalyst temperatures of past practice and materially better yields than have been obtained with hitherto known modified vanadium masses when operated at higher temperatures.

Another object is to provide a process for the production of maleic acid and maleic anhydride which may be operated at high temperatures, and therefore under conditions where the temperature control of the reaction is simpler and easier.

A still further object is to provide a method by which the velocity of the reaction between benzene and air to form maleic acid and maleic anhydride is so accelerated that a much increased rate of production can be obtained from a unit volume of catalyst over that which has been obtainable in the past.

Other objects will appear in the following detailed description of certain embodiments of the invention, or will be apparent to those employing my invention.

As an important part of my invention I have discovered that there is a group of substances which when associated in very small proportions with the vanadium oxide in a contact mass increases the production of maleic acid, and when associated in somewhat larger amounts, depresses and inhibits the productivity of the contact mass, and thus acts as a poison. The substances of this group are, of themselves, catalytically inactive, or at least very feebly active in promoting the vapor phase air oxidation of benzene to maleic acid. They are only effective within narrow limits, and the amounts associated with the vanadium oxide must be very closely controlled. The effect is progressive with addition of successive amounts. They are progressively beneficial to increase the yield and productivity of the contact mass as the amount is increased, and after a certain optimum is passed, further addition causes the beneficial effect and the yield to decrease and the poisoning effect on the contact mass becomes evident. Thus they are analogous to certain medicines of which small doses are beneficial and large doses poisonous. I therefore designate the substances as beneficial poisons.

The beneficial and the poisoning effects referred to are the effects of those substances when associated with an oxide of vanadium used as the productive catalytic agent in the vapor phase oxidation of benzene to maleic acid at elevated temperatures. These substances are primarily compounds of at least one other chemical element intimately associated with the vanadium oxide.

As a further important part of my invention I have discovered that there is a group of substances which when added in small amount renders the mass more productive at high temperatures, especially those approaching and exceeding the inception of red heat, so that the complete combustion is not so rapidly increased as the temperature increases beyond the range of temperatures employed in the past, thereby obtaining high yields of maleic acid or maleic anhydride at these higher operating temperatures. They act to inhibit or impede complete combustion at those high temperatures, and thus relatively increase the desired partial oxidation and the yield of the desired product. I designate those substances as red-heat combustion impeders or inhibitors.

In the main I have found that many or most of the beneficial poisons also act as red-heat combustion inhibitors. Therefore an important part of the invention involves the use with an oxide of vanadium of an action modifier which would perform the function of a poison if used in excess of a small dose but which acts as a promoter in such dose and which also acts as an inhibitor of complete combustion at a red-heat.

In the specific examples given hereinafter it will be shown that, when employing this type of modifiers of vanadium oxide used as a productive catalytic agent, amounts of less than 2% of the weight of the vanadium oxide are effective in the cases of elements such as sodium, potassium, lithium, and magnesium, and that greater amounts adversely affect the yield by inhibiting the desired catalytic action. Under some conditions, calcium and beryllium, are effective in amounts under 5% by weight of the vanadium oxide.

I have also found that mixtures of two or more beneficial poisons are sometimes more effective than either singly and especially that small amounts of sodium in combination with manganese or with others of the modifiers included in my invention give very desirable results.

In the present application, where I discuss various modifiers for vanadium oxide, these will be expressed as per cent of the vanadium oxide. In all cases, including claims, the vanadium oxide will be considered as the pentoxide ($V_2O_5$) although in its use in catalysis it may exist as a mixture of oxides of different degrees of oxidation. The amount of modifier will be calculated to its elemental equivalent, for example if sodium sulphate were used in preparing a catalyst, it will be calculated to the basis of Na. The percentage would then be calculated:

$$\frac{Na \times 100}{V_2O_5}$$

In expressing such percentages, I do not intend to convey that they represent the state of combination of the catalyst materials, but merely use it as a convenient method of expressing the amounts of various modifiers used on a definite and comparable basis.

Further, when I speak of the oxidation of benzene to maleic acid, I intend to include either maleic acid or maleic anhydride, or both, since in the process, the production of the acid or the anhydride depends on the amount of moisture in the air or other oxygen containing gas used and on the way in which the reaction products are collected, rather than on the catalytic reaction itself.

By the term benzene, I intend to include not only the pure product, but the crude and commercial benzols which contain high percentages of this hydrocarbon.

The present invention is chiefly concerned with the use of contact masses in which the productive catalytic agent is mainly vanadium oxide to which small amounts of certain compounds of elements, other than those of the fifth and sixth groups of the periodic system, have been added and which function as modifiers, or as red-heat combustion inhibitors, or as both.

I have made the discovery that surprisingly small percentages of the modifiers, when added to vanadium oxide, radically and profoundly change its catalytic effect on the oxidation of benzene to maleic acid. In all cases so far investigated, the optimum percentage of the modifier required has been below 5% of the vanadium oxide, calculated as heretofore specified. In most cases, not only do very small percentages (under 2%) give these results, but the range of percentages over which the modifier has beneficial effect is often extremely narrow. In general, percentages of less than 0.05% are not as effective as somewhat larger quantities and above the 5% limit set, all substances tried, which were beneficial in small quantities showed marked decrease of yield.

Moreover, the effectiveness of certain of the modifiers is also marked at the higher temperatures at and greatly exceeding the incidence of red heat so that commercially desirable yields can be obtained at catalyst temperatures hitherto considered as impractical for use. In some cases for example where a straight vanadium oxide would give over 50% complete combustion of the benzene at 580° C. and a low yield of maleic acid, an addition to the vanadium oxide of less than 0.4% of a certain modifier such as a potassium compound cuts the complete combustion materially and more than doubles the yield of maleic acid, whereas a potassium addition of 2% would almost entirely inhibit the productive catalytic action.

When it is considered that it has been found that with such a particular modifier marked increases in yields are obtained over the range of .001 to .004 part of modifier per part of vanadium oxide, and that a decrease to yields of no real commercial significance occurs as the modifier is increased to .01 part per part of vanadium oxide, it naturally follows that in practising the invention, great care is necessary to avoid uncontrolled addition of impurities. Such impurities may be derived from the chemicals used to prepare the contact mass, the materials of the apparatus in which the preparation of the mass is carried on, and the carrier on which the productive catalytic agent is coated.

I have found it advantageous to purify vanadium oxide in the following fashion. Dissolve 100 parts by weight of the usual commercial grade of chemically pure ammonium meta vanadate in 3200 parts of hot distilled water and filter the resulting solution. Heat the filtered solution in a silica or other suitable resistant vessel to about 70° C. and add dilute C. P. nitric acid (100 parts C. P. concentrated acid to 900 parts of distilled water) until just faintly acid to Congo red. Heat to boiling with mechanical agitation and maintain at the boiling point for one hour. Test for acidity and if necessary add nitric acid to acid reaction. Continue the boiling for one hour more, maintaining the solution just acid. At the end of this period a test sample on filtering should give a very pale yellow or colorless filtrate. A bright yellow or orange filtrate indicates that further boiling is required. When the boiling operation is finished, allow the liquid to stand and decant the clear solution above the precipitate. Filter off the precipitate on a chemically resistant suction filter and wash with distilled water until the filtrate is entirely free of acid. The filter cake is dried at 100 to 110° C. It is partially hydrated vanadium oxide and is assayed by ignition to determine its loss of weight. Each batch should be so assayed and calculations in catalyst preparation made on the basis of the ignited product as $V_2O_5$. As referred to in this specification, amounts of purified hydrated vanadium oxide may be taken to mean, except when otherwise specifically stated, amounts of vanadium pentoxide ($V_2O_5$) in the form of the hydrated oxide prepared as above described or by a method giving equivalent purification. The purity is advantageously controlled by a spectrographic analysis, as ordinary refined quantitative analytical methods are often not accurate enough to determine small traces of impurities which may produce such marked effects.

I have found further that when the contact mass is prepared in some of the usual ways in which these have been prepared in the art, uncontrolled amounts of impurities vitiating and clouding the results are introduced. It has been common practice to dissolve hydrated vanadium oxide in hydrochloric acid to form a solution of vanadyl chloride, add a carrier and evaporate to dryness with stirring to coat the carrier. The vessels employed for the operation have been chemical porcelain and enameled steel or cast iron. Under these conditions, I have found that impurities such as iron, calcium, magnesium and alkali metals have been introduced into the contact mass composition by corrosion or abrasion of the vessel employed and the uncontrolled amounts, although slight by ordinary standards, have been sufficient in some cases to materially lower the productivity of the mass when used for oxidizing benzene to maleic acid. I have found that it is possible to determine what is introduced from the substances of the container used and in some instances to add modifiers so as to compensate therefor and thereby obtain satisfactory yields, but better control and more uniform results can be obtained by carrying on the catalyst coating operations in a vessel made of fused silica or other resistant substance thereby avoiding the introduction of metallic groups, other than those designedly added, into the composition.

Further, carriers which are in common use, also may introduce impurities which vitiate the results. For example, it has been common practice to use Alundum granules as a carrier in vanadium contact masses. By the term "Alundum" I have reference to grains of fused alumina bonded into a porous mass by impure aluminum silicate. The alumina from which "Alundum" is made has been found to contain the so-called beta alumina which is a form of sodium aluminate. The sodium carried by the "Alundum" is mostly insoluble in acids and cannot be removed by the acid treatment which is usually applied to carriers before use to remove soluble materials. On ignition and during use, a vanadium oxide coating on "Alundum" takes up sodium in varying percentages from the carrier, depending on that present in the "Alundum," the amount of vanadium used for the coating and the temperature and time of ignition. Such sodium is then soluble in acid and can be removed along with the vanadium by hydrochloric acid. Since sodium is one of the elements I use as an addition product controlled to very small percentages, it is difficult when using "Alundum" as the carrier, although not generally impossible, to control its addition within the narrow limits necessary to obtain satisfactory results. Such carriers which impart sodium to the productive catalytic agent can be used by proper control of ratio of coating to carrier in many cases. They are quite useful where a mixture of sodium and another element is to be used as the modifier, so long as the sodium introduced is reasonably constant and not in excess of the proper amount. Spectroscopic control is a very convenient means of regulation in these cases.

Where no sodium addition is desired, I prefer to use a carrier of pure alumina or pure silica. A convenient method of preparing a carrier of suitable physical characteristics composed entirely and exclusively of silica is by binding together comminuted silica with silica obtained by the hydrolysis of an organic silicate as described in my co-pending application Serial No. 106,572 filed October 20th, 1936.

The present invention is however not limited to contact masses prepared with any special carrier. It is possible, though not always convenient, to use carriers which contain certain impurities by determining what they add to the vanadium coating under conditions of use and so controlling the conditions of making the contact mass and using it as to reach a desired end point of composition in the productive catalytic agent and proceeding in this way is considered within the scope of the present invention. In many cases spectrographic analysis of the catalyst coating (after dissolving it from the carrier by means of hydrochloric acid), both as prepared and as it exists after subjection to reaction conditions, especially if carriers of doubtful purity are used, is of great value in attaining the optimum results since the amounts of effective modifier and the range in which they are effective are often so small as to be determined only with difficulty by the ordinary analytical methods.

It is also desirable to use methods of contact mass preparation whereby the small amount of modifying material is intimately and uniformly distributed through the principal catalytic agent and whereby segregation or separation of the modifier in the catalyst may be prevented. Diluents, that is substances which do not substantially modify the catalytic effect of the productive catalytic agent, other than by simply reducing the amount present, may also be incorporated without departing from the spirit and scope of my invention.

Having now described a number of factors to be considered in the preparation of the types of contact masses embraced in my invention, I will present several specific examples of contact masses and their use in the production of maleic acid from benzene. These examples are illustrative of the invention but I do not intend that they shall of themselves limit the scope of the broad discovery herein disclosed.

In the accompanying drawing I have shown graphs indicating the effects of varying amounts of modifying elements. In the drawing:

Figure I is a graph showing certain effects of sodium.

Figure II is a graph illustrating results obtained with potassium.

Figure III is a graph of results obtained with lithium.

Example I

This procedure deals with the preparation and use of a contact mass in which the effect of vanadium oxide is modified by the addition of sodium in the form of sodium sulphate during the preparation of the contact mass. So as to clearly show the effect of the modifier, several contact masses with varying percentages of modifier added were prepared and tested for their catalytic efficiency.

The contact masses were prepared from hydrated vanadium oxide purified as previously described, and coated on an all silica carrier prepared as described in my co-pending application Serial 106,572 filed October 20, 1936, in the following way. 100 parts of dried hydrated oxide were dissolved in 475 parts C. P. concentrated hydrochloric acid in a silica container and the requisite amount of sodium sulphate added. The solution was heated until the vanadium oxide was completely reduced to vanadyl chloride, brought back to approximately its original volume by diluting with distilled water and 880 parts by weight of 6 to 10 mesh carrier added. The solution was then evaporated with agitation and coated on the carrier, heating being continued until the coated mass was dried.

In using the contact masses to produce maleic acid, they were placed in tubes of ¾" diameter immersed in a liquid bath whose temperature could be controlled and ignited carefully to a temperature of 550° C. measured in the contact mass for 5 to 8 hours while a stream of mixed benzene and air (25 parts by weight air to 1 part by weight benzene) was passed over the contact mass. After the ignition period, running was continued with the temperature measured in the mass held around 575° to 580° C., a ratio of air to benzene of from 25 to 35 to 1 by weight, and a contact time of about 0.10 to 0.12 second between the reacting gases and the mass. Contact time is calculated as:

$$\frac{9828\ VvP}{p\ (Q+q)\ (t+273)}$$

where:

$V$ = total volume contact mass in cubic feet.
$v$ = % voids in mass.
$P$ = absolute pressure in mass (pounds per square inch).
$p$ = atmospheric pressure (14.7 pounds).
$t$ = contact mass temperature in °C.
$Q$ = cubic feet free air per minute (at 0° C. and atmospheric pressure).
$q$ = cubic feet benzene vapor per minute (calculated to same temperature and pressure as Q).

Yields of maleic acid were determined and calculated as parts by weight of maleic acid per 100 parts of benzol fed to the apparatus. The results of five runs on different contact masses containing varying amounts of added sodium in the productive catalytic agent are shown in Figure I.

The very sharp peak of yield is evident and it is so sharp that a somewhat higher peak yield than that shown may exist slightly on either side of the high result obtained at approximately 0.73% of sodium content. The range in which yields of over 50 parts of maleic acid per 100 pounds of benzene are obtained is only from about 0.55% to 0.90% sodium in the vanadium oxide, which shows the care which must be taken with this particular composition to obtain the optimum results. On the entire contact mass, this range is only from 0.06% to 0.09%, an extremely small amount to produce such profound effects. This is a most surprising phenomenon illustrating the effect of my invention and one which has not even been hinted at in any prior studies on the production of maleic acid or maleic anhydride.

With pure alumina as the carrier, the range of sodium tolerance is broader and the curve appears as a plateau with falling yields somewhat above 2% sodium, rather than the sharp point obtained with the silica carrier.

As contact time, ratio and other factors of catalyst preparation and operation are varied, the optimum range of sodium addition changes but the general order and the effects are similar to those shown.

Slightly higher yields, but not substantially different from those shown may be obtained at somewhat lower contact mass temperatures. In comparison, the contact masses disclosed by Weiss and Downs in United States Patent 1,318,633 have never yielded more than 35 pounds maleic acid per 100 pounds of benzene under similar operating conditions and at the preferred operating temperature stated in the patent. At an operating temperature of 580° C. as used in this example, the contact mass disclosed in United States Patent 1,318,633 would give a yield of considerably less than half of that obtained at the preferred temperature. The contact masses disclosed by Craver in United States Patent 1,636,857 or those of Punnett 1,895,522 which involve the presence of 30 to 40% molybdenum oxide in the vanadium oxide (60 to 80 times the proportion of modifier used in this example), are not operable with good yields above 550° C. and at 580° C. show such high combustion and such low yields of maleic acid as to be of no economic significance.

Example II

This example shows the effect of controlling the modifying agent in a case where the procedure of contact mass preparation introduces certain impurities which in themselves exert an effect on the catalytic activity of vanadium. The contact masses of this example were prepared just as in Example I with the following exceptions:

(a) An R. A. 98 Alundum carrier washed free of soluble material with hydrochloric acid before use was employed.

(b) The preparation was carried out in vessels of Coors porcelain.

(c) Potassium sulphate was used as the beneficial poison.

A spectroscopic examination of the catalytic coating dissolved from the carrier after use, indicated the presence of magnesium, sodium, and calcium to a total of less than 3% of the $V_2O_5$ in addition to the added potassium. Incidentally potassium in these amounts cannot be accurately determined by the spectroscope in the presence of large amounts of vanadium and requires special analytical procedures.

The results of a number of runs at 520° contact mass temperature and 580° contact mass temperature with the same ratios of air and benzene as in Example I are shown in Figure II. The results, as would be expected, are slightly more erratic than in Example I due to the fact that the modifying substances introduced during the preparation and use of the masses must vary slightly from one lot to another. We have however, a similar peak to that shown in Example I and the necessity of close control is obvious. Moreover, the four results at 580° coincide with the results on the same masses at 520° C. within the limits of experimental error showing the impeding of combustion at a red-heat. As in example I the peak yield obtainable may be at a somewhat higher intermediate point than that specifically shown and changes in conditions of preparation and operation may shift the preferred range somewhat in either direction.

Example III

In this example a hydrochloric acid washed carrier of a so-called "Tabular Corundum" made by the Aluminum Co. of America and containing a small amount (0.2 to 0.25%) of sodium (Na) was employed. The use of "Tabular Corundum" as a catalyst support is believed to be new, and certain features in connection therewith is more specifically described and claimed in a copending application Serial No. 219,187, filed July 14, 1938. The same general procedure as in Example I was used to prepare the catalyst and lithium sulphate was added instead of sodium or potassium sulphate and a "Pyrex" glass container was used to prepare the contact mass. After ignition at 550° C. the several masses (with varying proportions of lithium) were used to produce maleic acid, using a contact mass temperature of 580° C., a contact time of 0.1 second and a ratio by weight of air to benzene of between 26 and 29 to 1. Tests on the masses after use indicated an addition of less than 1.0% of sodium to the vanadium oxide coating. The yields of maleic acid, related to the lithium content of the vanadium oxide are shown in Figure III. The marked effect of percentage of lithium oxide below 1% and the rapid fall in yield as the lithium oxide percentage is increased is quite striking and characteristic of my invention. Under the conditions where commercial yields are obtained, the total sodium + lithium is less than 2%.

It is further of interest to note that the contact mass with a productive catalytic agent containing approximately 0.28% of lithium was run at a temperature of 610° C. for an extended period with a somewhat reduced contact time (.06 to .09 second), and a ratio of between 25 and 33 to 1. At the start of the period, the determined yield was 72 pounds of maleic acid per 100 pounds of benzene and after 240 hours continuous running under these conditions, the determined yield was 69 pounds per 100 pounds benzene, an almost unbelievable stability of yield at a temperature so far above the incidence of red heat and indicating the extent of retardation of complete combustion.

Example IV

Several contact masses were prepared and used in the same general way as described in Example III using additions of manganese to the productive catalytic agent in the form of

$MnSO_4.2H_2O$ and the same tabular corundum as the carrier as used in Example III. The additions were calculated to percent Mn based on the vanadium oxide ($V_2O_5$). With ratios of air to benzene by weight of about 30 to 40 to 1 the following results were obtained, expressed as parts maleic acid per 100 parts benzene.

| $\frac{Mn \times 100}{V_2O_5}$ | Contact mass temperature | | |
|---|---|---|---|
| | 550° C. | 580° C. | 610° C. |
| 0 | | 57.5 | |
| 0.195 | | 65.4 | |
| 0.39 | 69.5 | 73.4 | 63.8 |
| 0.585 | 71.9 | 71.6 | 70.2 |
| 0.77 | 74.2 | 70.4 | 66.0 |
| 0.97 | 57.2 | 49.7 | 67.6 |

Contact times were around 0.14 to 0.16 second at 550° C., 0.10 to 0.12 second at 580° C., and 0.07 to 0.09 second at 610° C. This shows that the optimum percentage addition of a given modifier may change somewhat with temperature of operation and with contact times. When the manganese addition is increased somewhat above one percent, the yields fall further and at a 2% addition, the poisoning effect is marked. The sharp drop in yield above 0.77% Mn at 550° and 580° C. is quite noticeable. At 610° with shorter contact time, the break is more gradual.

*Example V*

Similar tests were run as in Example IV except that beryllium sulphate ($BeSO_4H_2O$) was employed as the modifier of the productive catalytic agent. The results were:

| $\frac{Be \times 100}{V_2O_5}$ | Contact mass temperature | | |
|---|---|---|---|
| | 550° C. | 580° C. | 610° C. |
| 0.19 | 53.0 | 61.2 | 55.6 |
| 0.38 | 73.0 | 69.1 | 61.2 |
| 0.57 | 66.0 | 64.5 | 72.6 |
| 0.77 | 65.7 | 56.5 | 66.2 |
| 0.96 | 63.8 | 51.7 | 54.4 |
| 2.00 | 53.1 | 52.0 | 48.0 |

Ratios were in the range of 28 to 35 to 1 and contact times were close to 0.14 seconds at 550° C., 0.10 second at 580° C. and 0.065 second at 610° C.

Here the drop in yield is quite marked at 580° and 610° C. above the 0.57 of Bé. while at 550° C. the drop is more gradual. It is probable that somewhat higher yields, especially at 580°, could have been obtained with a beryllium addition intermediate to some of those shown.

*Example VI*

This represents a series of runs with all conditions like those of Examples IV and V with the exception that $MgSO_4.7H_2O$ was added during the preparation of the contact mass and thereby incorporated into the productive catalytic agent. The results obtained with these masses were:

| $\frac{Mg \times 100}{V_2O_5}$ | Contact mass temperature | | |
|---|---|---|---|
| | 550° C. | 580° C. | 610° C. |
| 0.2 | 55.1 | 61.0 | 50.8 |
| 0.4 | 64.0 | 68.0 | 65.4 |
| 0.8 | 56.2 | 61.3 | 53.8 |
| 1.0 | 32.4 | 45.1 | 44.5 |

Contact times were about 0.14 second at 550° C., 0.10 second at 580° C. and approximately 0.08 second at 610° C.

It is evident that magnesium is undesirable under the conditions used above 1% and even with the sodium added from the carrier, the total addition products are less than 1.5% of the vanadium oxide at the peak yields. The peak for magnesium addition under the conditions used appears to be around 0.4% and as little as one percent is decidedly poisonous.

*Example VII*

This series of runs was carried on in the same way as the three preceding examples, the productive catalytic agent being modified by the addition of calcium sulphate. The results obtained were:

| $\frac{Ca \times 100}{V_2O_5}$ | Contact mass temperature | |
|---|---|---|
| | 580° C. | 610° C. |
| 0.2 | 63.8 | 57.1 |
| 0.4 | 67.1 | 61.8 |
| 0.6 | 66.2 | 68.5 |
| 1.0 | 65.0 | 66.8 |
| 1.5 | 74.5 | 68.2 |
| 2.0 | 76.5 | 69.4 |
| 3.0 | 73.7 | 69.9 |
| 6.00 | 55.5 | 58.4 |

The results at 580° C. were with a contact time of 0.10 to 0.11 second while at 610° C. a contact time of 0.065 to 0.08 second was used. High yields are obtained on a plateau rather than at a very sharp peak.

I have specified various conditions of operation as to ratio, temperature, contact and tube size in the examples so as to make the disclosure complete and operable but do not intend to limit the scope of my invention thereby. I may use contact mass temperatures between 400° and 700° C. but prefer for the best yield results, temperatures between 450° and 650° C. From the standpoint of ease of control of the operation, the higher temperatures present certain advantages. In the first place, since the entering gases may be used to absorb the reaction heat in part, the higher the temperature of reaction, the greater their heat carrying capacity and the less the need for other means to absorb heat to maintain the contact mass temperature at the desired point. Secondly, when operating somewhat below the maximum advantageous temperature, the close control of temperature is not necessary if a moderate rise can do little or no damage to the yield obtained. Thirdly, the higher temperatures increase the reaction velocity, thereby rendering lower contact times practical. This in effect increases the productivity of a given size of apparatus and decreases the investment cost per unit of output.

In general, I have employed ratios of air to benzene of between 20 to 35 parts by weight of air to 1 part of benzene, but I am not limiting my invention to any exact ratio. It is desirable in plant operations as a practical matter to use ratios high enough to be above the explosive limits and not too high so as to cut down the output of a given set-up. Good results in the various tests have been obtained with contact times of 0.05 to 0.25 second and in general lower contact times of 0.05 to 0.10 second are more desirable at the higher contact mass temperatures. Other factors being equal, the lower contact times are advantageous in that as previously stated the productivity of a given size apparatus increases with decreasing contact time.

Increased productivity of equipment can also be obtained within certain limits, by increasing the pressure on the gases passing through the catalytic converter so as to increase the feed and at the same time maintain the contact time the same as with a lower rate of feed at a lower pressure. Such variations as this are well known tools of the art and may be applied in connection with the processes of the present invention. Any type of converter suitable to these reactions may be employed.

Although certain of the contact masses may be of use in other organic oxidations, I am not attempting to include such other processes in the scope of the present invention. I have found by long experience in the field of catalytic chemistry that a contact mass found suitable for one organic oxidation may not be and probably is not at all suitable when applied to another reaction.

In the present case I have made the discovery that highly productive vanadium contact masses for the oxidation of benzene to maleic acid giving yields in excess of 50 pounds maleic acid per 100 pounds of benzene in a single passage over the catalyst can be produced by using as the productive catalytic agent, a vanadium oxide with an amount of less than 5% of a modifying agent, said percentage being calculated on the basis as hereinbefore set forth. In contradistinction, the prior art and prior practices have never been able to produce yields of this magnitude with vanadium oxide without the use of quantities of modifiers far in excess of the proportions peculiar to my invention. Up to the present, it was not even suspected that contact masses including vanadium with amounts of modifying agents of the range stated here would be effective in the reaction of benzene to maleic acid, and that with some modifiers, such small variations in percentage would have such profound effects so that such small amounts would prove of advantage and somewhat larger amounts so detrimental.

Further for the first time, by the use of red heat combustion impeders, contact masses with productive catalytic agents giving yields of this magnitude have been produced which are not affected in a major way by increasing temperatures so that with the processes of this invention, high yields of maleic acid from benzene can be obtained at temperatures at or above the incidence of red heat. Operation in the range of 580° to 650° C. was hitherto thought impossible with any contact mass if even moderate yields were to be obtained. These oxidation reactions are not reversible and combustion to $CO_2$ and water represents irretrievable loss of product. The advantage of a catalytic process in which a temperature rise of twenty or even fifty degrees above the operating point does not change the results to a very substantial degree, is of great advantage in large scale operations.

The metallic groups used as beneficial poisons and/or red heat combustion impeders, are not necessarily introduced as sulphates which were specifically described but other salts may be used instead. It may be noted that, by the time the contact masses, prepared as described, were ignited and ready for use, the sulphate radical had been expelled and could not be detected by delicate analytical tests. Some modifiers included in this invention may be added as mixtures of two or more salts of different metals or as compounds of the oxides of two or more elements, for example, phosphates, or some elements added may be introduced as a borate or vanadate.

Having thus described my invention, what I claim as new and desire to secure by Letters Patent is:

1. The method of producing maleic acid from benzene, which comprises pasing benzene and air over a heated contact mass having a productive catalytic agent consisting essentially of a higher oxide of vanadium and a sodium compound, the amount of said sodium being between 0.4% and 1.0% of the vanadium oxide.

2. The method of producing maleic acid from benzene, which comprises passing benzene and air over a heated contact mass having a productive catalytic agent consisting essentially of a higher oxide of vanadium and a potassium compound, the amount of said potassium being between 0.1% and 0.6% of the vanadium oxide.

3. The method of producing maleic acid from benzene, which comprises passing benzene and air over a heated contact mass having a productive catalytic agent consisting essentially of a higher oxide of vanadium and a lithium compound, the amount of lithium not to exceed 0.8% of the vanadium oxide.

4. A contact mass for the vapor phase catalytic production of maleic acid from benzene at an elevated temperature, consisting of a productive catalytic agent composed of a higher oxide of vanadium and a potassium compound the amount of potassium being .01% to .06% of said vanadium oxide.

5. The method of producing maleic acid from benzene, which comprises passing benzene and air over a heated contact mass having a productive catalytic agent consisting essentially of a higher oxide of vanadium and a reaction modifier selected from the group consisting of compounds of the following metals—sodium, potassium, potassium and sodium, lithium, lithium and sodium, calcium, calcium and sodium, magnesium, magnesium and sodium, beryllium, beryllium and sodium, and manganese and sodium, the amount of such modifier being less than that which would normally act to poison the catalyst.

6. The method of producing maleic acid from benzene which comprises passing benzene and air over a heated contact mass having a productive catalytic agent consisting essentially of a higher oxide of vanadium and at least one compound of an alkali-forming metal, said metal having an atomic weight not substantially exceeding 40, the amount of said compound being less than would normally act to poison the catalyst.

JOHN M. WEISS.